Figure 4:
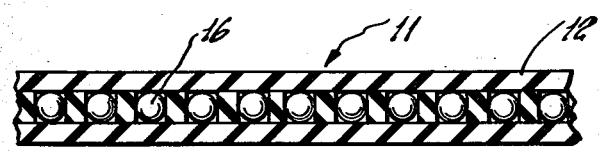

April 28, 1964        R. E. PETERSON        3,130,700
VIBRATION AND MECHANICAL WAVE DAMPING
Filed April 29, 1960        5 Sheets-Sheet 1
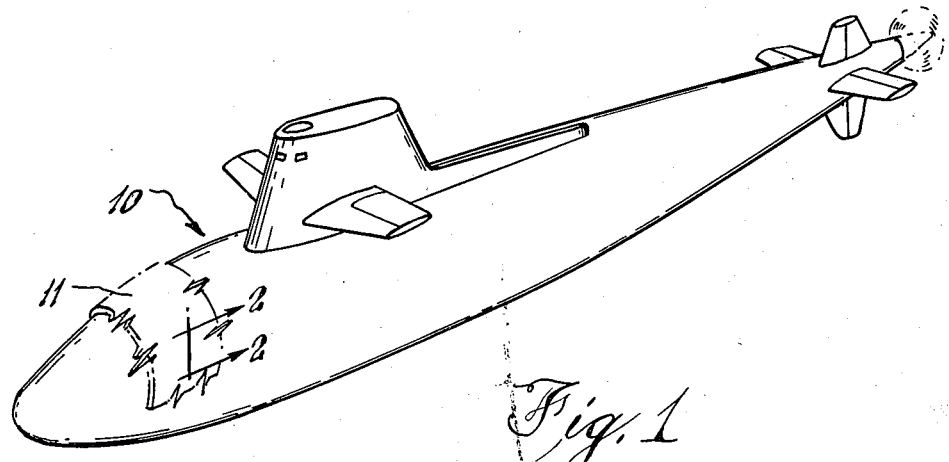
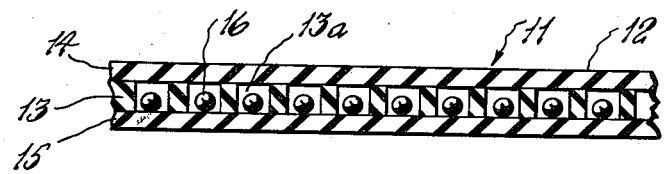
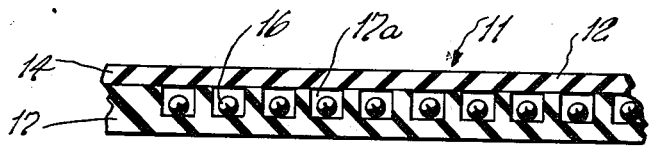
INVENTOR.
ROBERT E. PETERSON
BY
ATTORNEYS

INVENTOR.
ROBERT E. PETERSON
BY
ATTORNEYS

April 28, 1964  R. E. PETERSON  3,130,700
VIBRATION AND MECHANICAL WAVE DAMPING
Filed April 29, 1960  5 Sheets-Sheet 3

INVENTOR.
ROBERT E. PETERSON
BY
Max A. Farmer
ATTORNEYS

April 28, 1964 R. E. PETERSON 3,130,700
VIBRATION AND MECHANICAL WAVE DAMPING
Filed April 29, 1960 5 Sheets-Sheet 4

INVENTOR.
ROBERT E. PETERSON
BY
ATTORNEYS

April 28, 1964 R. E. PETERSON 3,130,700
VIBRATION AND MECHANICAL WAVE DAMPING
Filed April 29, 1960 5 Sheets-Sheet 5

INVENTOR.
ROBERT E. PETERSON
BY
ATTORNEYS

United States Patent Office 3,130,700
Patented Apr. 28, 1964

3,130,700
VIBRATION AND MECHANICAL WAVE DAMPING
Robert E. Peterson, Rte. 1, Box 129, Old Lyme, Conn.
Filed Apr. 29, 1960, Ser. No. 25,799
23 Claims. (Cl. 114—20)
(Granted under Title 35, U.S. Code (1952), sec. 266)

The invention described herein may be manufactured and used by or for the Government of the United States of America for governmental purposes without the payment of any royalties thereon or therefor.

This invention relates to the control, transfer, reflection and nullification of vibratory energy, and has particular application to vibration damping of structural elements such as pipes, rods, brackets, plates particularly on water-borne vessels or vehicles such as on surface ships and submarines to reduce emission of mechanical wave energy therefrom and to reduce their target strength as seen by passive and active sonar equipment.

An object of the invention is to provide improved means for reducing the transfer of mechanical vibrations and sounds through a wall or member, for reducing the reflection of vibrations impinging on a wall or member, for controlling and reducing the amount of vibrations transmitted or emitted by a member that is subject to vibration, and which will be relatively simple, practical, effective and inexpensive in construction.

An object of this invention is to attenuate vibration energy occurring in structural members and movable members such as propellers and other drive components.

A further object is to absorb and otherwise attenuate a substantial portion of mechanical wave energy incident upon a structure to minimize reflection of the energy.

A further object is to reduce the probability of detection of a water-borne vessel by a passive or active sonar by substantially attenuating that portion of the vibration energy developed in the vessel and directed outwardly of the vessel toward the surrounding water, and by substantially attenuating any mechanical wave energy incident upon the vessel to minimize reflection of the incident energy.

Figure 5:
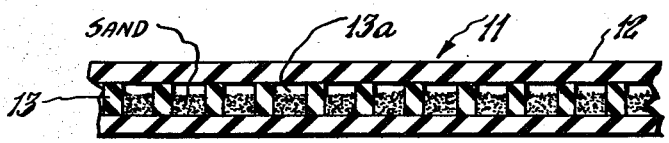
Figure 6:
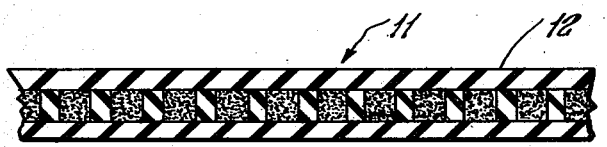
Figure 7:
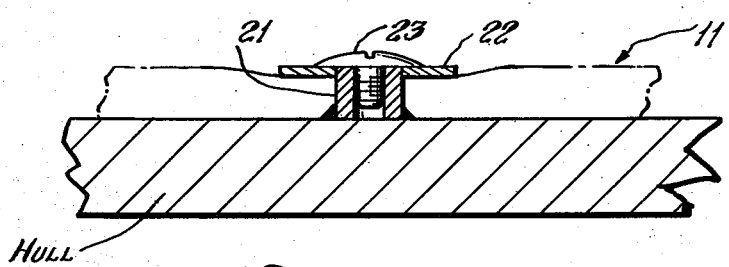
Figure 8:
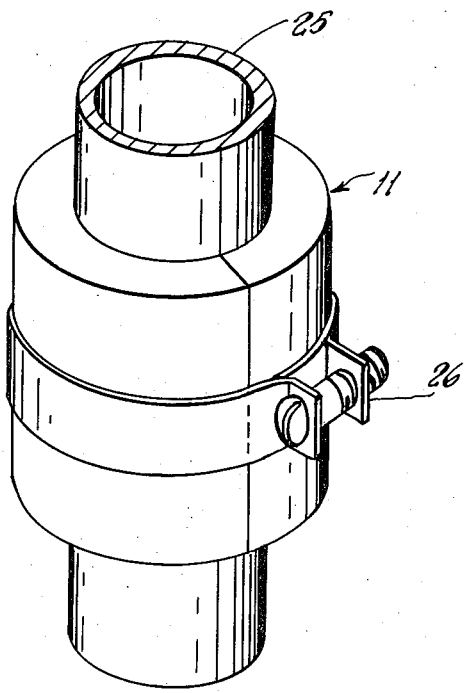
Figure 9:
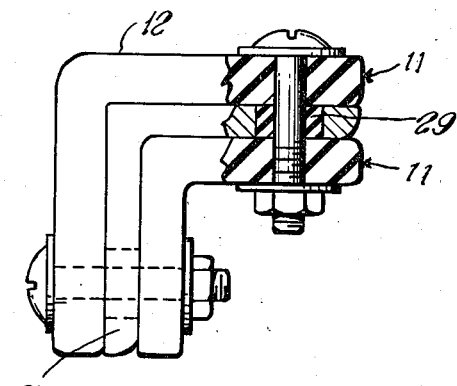
Figure 10:
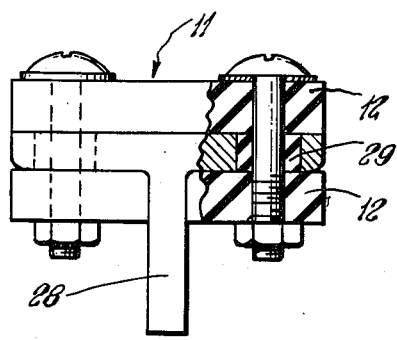
Figure 11:
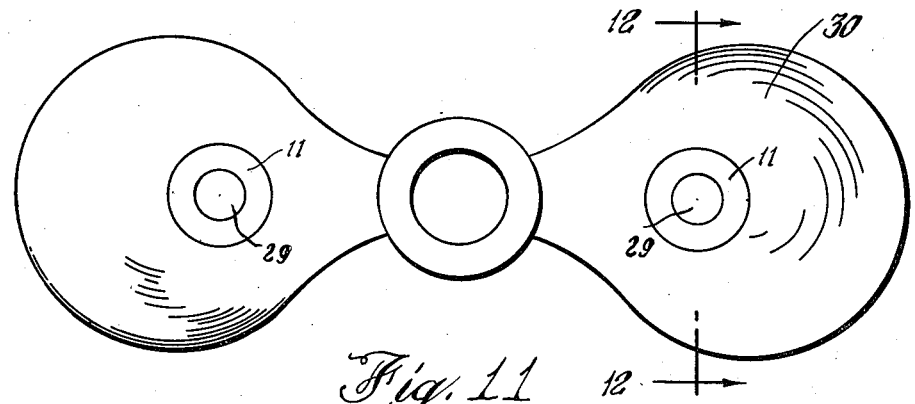
Figure 12:
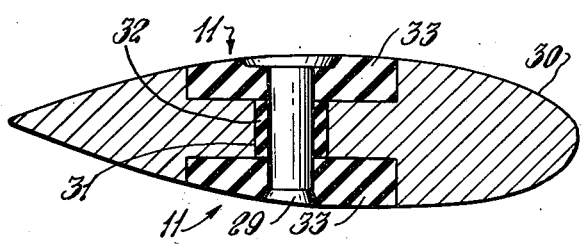
Figure 13:
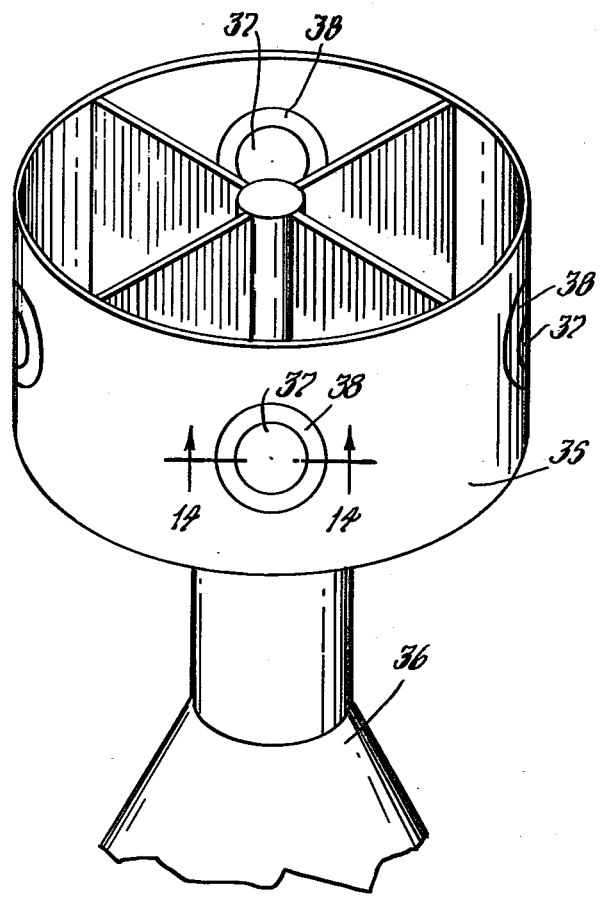
Figure 14:
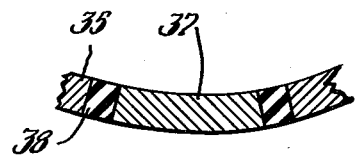

Other objects and many of the attendant advantages of this invention will be readily appreciated as the same becomes better understood by reference to the following detailed description when considered in connection with the accompanying drawings wherein:

FIG. 1 illustrates a submarine including as an outside layer over a substantial portion thereof novel vibration and mechanical wave energy attenuating features in accordance with this invention, FIGS. 2 to 6 illustrate in cross section several embodiments of attenuating layers in accordance with this invention, FIG. 7 illustrates a fastening arrangement for an attenuating layer as shown in FIGS. 2 to 6, FIG. 8 illustrates an arrangement for attenuating mechanical vibration in a pipe or rod in accordance with this invention, FIGS. 9 and 10 illustrate arrangements for attenuating mechanical vibration in a structural angle member and structural T-member respectively in accordance with this invention, FIG. 11 is a plan view of a propeller including an arrangement for attenuating mechanical vibration energy in the propeller, FIG. 12 is a cross section view of the propeller taken on line 12—12 of FIG. 11, FIG. 13 is a partial isometric view of the tail end of an underwater missile including an arrangement for attenuating mechanical vibration energy in the shroud ring of the missile, and FIG. 14 is a cross section view taken on line 14—14 of FIG. 13.

There is shown in FIG. 1 a submarine 10 in and on which this invention has been applied. The submarine showing is not intended in a limiting sense but rather in a representative sense because this invention is applicable to water-borne vessels, vehicles, missiles, and stationary installations such as buoys, having exterior surface area exposed to the sea water and which are capable of being detected by passive or active sonar. However, this invention does have particular utility on submarines, being very effective and suited to submarine pressures. The broken line rectangular area 11 on the submarine represents a portion of a vibration and mechanical wave attenuating layer that covers substantially all of the exterior surface of the hull which otherwise is capable of detection by sonar either through radiation or through reflection of mechanical wave energy.

In FIGS. 2–6 inclusive there are illustrated several embodiments of attenuating layers suitable as the layer 11 in FIG. 1. The body 12 of the layer in each of the embodiments is of a material that is compliant, resilient, elastic, readily deformable (e.g., a rubber or rubber-like material, an elastomer). A suitable material for water-borne vessels is neoprene, one reason being that in sea water it reflects a minimum of incident mechanical wave energy. Disposed within and carried by the neoprene body 12, there is a distributed discontinuous inertia means substantially more dense than the neoprene body 12. In each of the embodiments the composite layer 11 may be cut to fit a desired area and may be draped and molded over the area to be covered and cemented and/or fastened thereto.

In FIG. 2, neoprene body 12 includes a perforated central neoprene sheet 13 and a pair of sandwiching sheets 14 and 15 cemented thereto. In each perforation in central sheet 13 there is disposed one sphere or pellet 16 of a dense material, e.g., iron or lead. Several smaller pellets, not shown, may be included in each perforation instead of one pellet as shown on the drawing, and the pellets in each space may, if desired, be of random sizes for broad band damping purposes. The pellets 16 are smaller than the perforations and are free to move to a limited extent in the air spaces within the perforations. When assembled on a submarine, the layer 11 absorbs and attenuates mechanical vibrations in the hull and absorbs and attenuates incident mechanical wave energy in two ways, even at substantial depths. First, all the pellets 15 taken together function as an inertia wall that is fairly stationary with respect to incident mechanical energy so that the neoprene is deformed and worked relative to the inertia wall by the incident energy, and alternately compressing and enlarging the air spaces producing heat in the neoprene and in the confined air, whereby a substantial portion of the mechanical energy is absorbed. Second, where the individual elements of the inertia means are not identical and where they are free to move within their confined spaces as in FIG. 2, and the incident energy level is high enough to cause them to move, their movements are in random phase relative to the incident mechanical energy causing some attenuation by feedback. At some frequencies depending upon the parameters, the effectiveness of the damping is substantially enhanced by the feedback.

The embodiment shown in FIG. 3 is substantially the same as in FIG. 2 except that in place of perforated sheet 13 and one of the sandwiching sheets 15, there is substituted a single sheet 17 molded to include therein recesses for the pellets 16. Forming a neoprene sheet with molded recesses is expensive compared to the three sheet sandwich arrangement in FIG. 2. However, the damping effect is better with one cement layer than with two layers because the cement, if poorly applied, may reduce some of the damping effect.

The embodiment shown in FIG. 4 differs from that shown in FIG. 2 in that the pellets 16 fit snugly within the neoprene body 12 but with remanent air space in each perforation. With this arrangement, more of the incident energy is converted into heat in the rubber and in frictional contact when the pellets rub against each other and less is attenuated by feed back due to movement of the pellets as compared to the results obtained with the embodiments illustrated in FIGS. 2 and 3.

The embodiments shown in FIGS. 5 and 6 differ from those in FIGS. 2 and 4 respectively only in that loose sand or metal filings of the same or different sizes are confined in the perforations rather than pellets 16. There is remanent air in both forms. The sand or filings type of inertia means costs less than pellets; however, sand or filings are less dense than pellets and do not have as much of a inertia effect. These embodiments do not exhibit as pronounced resonant feedback effects as are obtained with the embodiments illustrated in FIGS. 2 and 3.

Regardless of which of the disclosed embodiments is utilized, the tailoring procedure used in applying the attenuating layer to the hull of a vessel may be the same. The attenuating material 11 is draped on the hull and cut with a suitable shears to fit over and cover a chosen area. Then the cut pieces of attenuating material are cemented face to face to the hull. Where anticipated operating conditions or experience indicate that attachment by cementing is not adequate and needs to be reinforced, a fastening arrangement of the type illustrated in FIG. 7 may also be utilized. In the latter instance, internally threaded studs 21 are welded or cemented to the hull at spaced intervals. Then the material is draped as above and cut to fit over and cover a chosen area. Then while the cut piece is held in position, holes are cut therethrough for registration with the studs 21. Then the attenuating material is cemented in place. Washers 22 and screws 23 are then assembled over the studs to fasten the attenuating material to the hull. Instead of the fastening arrangement shown in FIG. 7, screws may be threaded directly into the hull to fasten the attenuating material to the hull; while the latter fastening method may be carried out at lower cost it is less desirable because it may tend to compromise the strength and the watertight integrity of the hull. Fastening without cementing is not too satisfactory for damping hull vibration. Most effective results are obtained when the material is cemented even where fastenings are used. The damping material may be furnished as individual tiles approximately one foot square for ease of installation.

Another significant function of the materials illustrated in FIGS. 2–6 when installed as a hull coating on the outside of water borne vessels particularly submarines, as shown in FIG. 1, is reduction in drag enabling the vessel to reach higher speed with the same propulsion power. Elastomeric compliant coatings as described herein, when applied to hydrodynamic shapes exposed to water flow reduce turbulence. This significant characteristic of the coating material is obtained in addition to the mechanical damping characteristics described above. The coating material may be on the order of ½ inch in overall thickness for good results.

FIGS. 8, 9, 10, 11 and 12 illustrate applications of this invention to elements other than hulls. In FIG. 8, the attenuating material 11 is wrapped around a rod or pipe 25 subject to vibration and secured by a conventional clamp 26, much as a heat insulating sleeve is secured on a steam pipe. The clamp as well as the attenuating material serve to dampen vibration in the pipe 25. The heavier the clamp the more it functions as an inertia member whereby when the pipe vibrates, the coating 11 with pellets or other loose inertia elements is worked between the pipe and clamp. In FIGS. 9 and 10 the attenuating material is cemented and bolted in place to cover selected surface areas of a structural angle member 27 and a structural T-member 28 respectively. Though the inertia elements are not shown in this embodiment for simplicity of illustration, they will afford the same advantages in these combinations as in the preceding illustrations. However, some attenuation is obtained even if the attenuating material is not loaded with inertia elements. Neoprene sleeves 29 disposed in the bolt holes extending through the angle and T-members contribute to the vibration damping action because the mass of the securing bolts if shock and vibration isolated from the members 27, 28 contribute to the damping effect. To dampen vibration in a lengthy structural member, a short length of the attenuating material 11 may be attached as above to the center of a span of the structural member with good results.

In FIGS. 11 and 12 this invention is applied to a propeller 30 to dampen vibrations in the propeller. A hole 31 counterbored at both ends is formed in the propeller. A neoprene isolating sleeve 32 is disposed in the hole 13. Ring-like sections 33 of the attenuating material 11 which may be loaded with inertia elements are seated in the opposed counterbores and secured by a rivet or bolt 29 extending through the ring-like dampers and the neoprene sleeve 32 in the propeller.

A somewhat simpler spot dampener arrangement in accordance with this invention is illustrated in FIGS. 13 and 14 applied to the shroud ring 35 of an underwater missile 36. This spot dampener arrangement includes a disk 37 of a dense material such as lead bonded or cemented to a neoprene ring 38 which in turn is bonded or cemented to the wall of an opening through the shroud ring 35. This spot dampener arrangement though less effective than the arrangement shown in FIGS. 11 and 12 is applicable to a thin wall where it must be within the contour of that wall.

In each disclosed embodiment of this invention inertia means are compliantly coupled by the surrounding and confining elastomeric material to an element subject to vibration or likely to receive mechanical wave energy. The mechanical vibration energy or incident mechanical wave energy is attenuated by deforming and working the elastomeric material supporting the inertia means. The inertia means tends to remain comparatively stationary relative to incident mechanical energy while the elastomer is worked thereby converting the energy into heat with high conversion efficiency. Limited movement of the inertia means by the energy within the elastomeric support will attenuate some of the incident energy by out-of-phase feedback and by the work done in moving the inertia means.

It will be understood that the perforations or recesses 13a and 17a may be advantageously of nonuniform diameters or spacings in directions parallel to the faces of the panels or sheets 12.

While the invention has been described in connection with submarines, and exteriorly exposed members that may vibrate in use, it will be understood that the vibration damping means may be applied to interior areas such as to walls, i.e., interior bulkheads, of any ship to prevent transfer or passage of vibrations through such walls. In fact, in its broadest concept, the damping means may be applied to any wall or body, whether or not water borne, to damp or absorb vibrations that may occur in or be applied to said wall or body or which may impinge thereon from an outside surface.

When the exterior surface of a vessel, such as a submarine, is covered with this vibration damping covering using inertia-loaded elastomeric material in accordance with this invention, various vibrations arising within the vessel that are applied to or are incident on said covering, will be damped and absorbed in part or entirely by the elasticity of the elastic covering material, and by the absorption of the vibratory energy by the inertia elements or masses. This energy in producing motion of the inertia element or elements with which the elastic covering or material is loaded, will be absorbed and converted into heat, and the frictional rubbing of inertia elements on one another in motion in a common space, or against the confining surface of such a space will convert much of such energy into heat and dissipate it, so that it will not be transmitted or reflected.

Vibrations incident on such a covering through the water in contact with such covering, will tend to deform the covering, and the inertia element loading in the covering will absorb and dissipate the energy of such incident vibrations instead of reflecting them back into the water. This makes a vessel so covered with this new covering below water, difficult to locate by sonar and underwater sound, because the sound waves impinging on the covering will be absorbed and dissipated instead of being reflected backwardly. By preventing or reducing transmission of sound from the interior of a ship to the water surrounding the ship, by such covering on the ship surfaces that are in contact with the sea, the possibility of detection of the presence of such a vessel by sonar is greatly reduced or prevented. Where a vessel has a flooded sonar chamber, the application of such an inertia-loaded elastic covering to the bulkhead or wall separating the flooded sonar chamber from the interior of the ship is effective in reducing the vibrations that pass from the interior of the vessel to the transducers in the sonar chamber. The damping coating of an elastic sheet loaded with inertia elements, as explained hereinabove, is useful in reducing or eliminating the passage of vibrations through a wall covered with such coating in both directions.

Obviously many modifications and variations of the present invention are possible in the light of the above teachings. It is therefore to be understood that within the scope of the appended claims the invention may be practiced otherwise than as specifically described.

I claim:

1. A method of resisting the development of vibration in a submarine hull comprising transferring the vibrational energy to an elastomer to produce changing deformation in the elastomer whereby a substantial portion of the vibrational energy in the hull is converted into heat in the elastomer.

2. In a submarine which is capable of emitting mechanical wave energy into the water, which energy is capable of detection by sonar equipment, and which will reflect a substantial portion of incident mechanical wave energy as from a remote search sonar, the method of reducing said emission and reflection of mechanical wave energy by said submarine and reducing the probability of its detection by sonar which comprises applying the mechanical wave energy passing immediately adjacent the exterior of said submarine directed inwardly or outwardly of said submarine to an elastomer to work the elastomer to convert a substantial portion of the mechanical wave energy into heat in the elastomer.

3. In a water-borne vehicle carrying therein apparatus capable of mechanical vibrations in use and which vibrations may be transmitted outwardly to the water in which said vehicle is borne, the method of reducing the said outward transmission of energy which comprises applying said outwardly moving energy to an elastomer closely adjacent the surface of the vehicle in contact with the water to produce changing deformation in the elastomer to convert some of the energy into heat in the elastomer and to apply the energy to inertia means to cause movement of the inertia means in random phase relative to the energy to reduce the intensity of the outwardly moving energy.

4. In a water-borne vehicle carrying therein apparatus capable of mechanical vibrations in use, and which vibrations may be transmitted outwardly to the water in which said vehicle is borne, the method of reducing said outward transmission of energy which comprises deforming an elastomer closely adjacent surface areas of the vehicle below the surface of the water with said outwardly moving energy to convert some of the energy into heat in the elastomer, and cause movement of inertia means in random phase relationship relative to the energy to reduce the intensity of the outwardly moving energy.

5. In a water-borne vehicle carrying therein apparatus capable of mechanical vibrations in use and which vibrations may be transmitted outwardly of the vehicle to the water in which said vehicle is borne, and which may reflect incident mechanical wave energy transmitted by a sonar equipment spaced from said vehicle, the method of reducing said transmission of and reflection of energy and reducing the probability of detection of the vehicle which comprises converting some of said energy into heat and dissipating it and converting some of the energy into motion of inertia means in random phase relationship with the energy to attenuate the energy.

6. In a water-borne vehicle of the type which is capable of emitting mechanical wave energy into the water capable of detection by sonar equipment and which will reflect a substantial portion of incident mechanical wave energy as from a remote search sonar, the improvement therein for reducing said emission and reflection of mechanical wave energy by said vehicle and reducing the probability of its detection by sonar which comprises a layer of mechanical wave energy absorbing material covering and carried by at least a substantial portion of the outer, otherwise exposed, surface of said vehicle.

7. In the improved water-borne vehicle defined in claim 6 wherein said material includes a pliable material in sheet form and in which is embedded inertia means substantially more dense than said pliable material and in which there are trapped air spaces, both disposed between the opposed major surfaces of said pliable material and ranging over an area coextensive with said pliable material.

8. In the improved water-borne vehicle as defined in claim 7 wherein said inertia means are a plurality of small bodies.

9. In the improved water-borne vehicle as defined in claim 8 wherein said pliable material is an elastomer material and supporting said inertia means against movement therein.

10. In the improved water-borne vehicle as defined in claim 8 wherein said small bodies are free to move in confined air spaces within said pliable material in a direction transverse to its major surfaces.

11. In an improved water-borne vehicle as defined in claim 10 wherein said pliable material is an elastomer.

12. A vibration damper and mechanical wave energy attenuator for the hull of a water-borne vessel to reduce transmission of mechanical vibration from the vessel to the water and to reduce the reflection of mechanical wave energy incident upon the vessel comprising compliant resilient material in sheet form having in the body of said material intermediate the opposed major surfaces thereof distributed bodies of substantially greater density than said compliant material and distributed trapped air spaces whereby when one surface of the material is secured to the hull and the other surface of the material is exposed to the water, mechanical wave energy arriving at said material from the hull of the vessel or from the sea is substantially attenuated thereby.

13. A vibration damper and mechanical attenuator as defined in claim 12 wherein said distributed bodies are pellets of a dense material and wherein each pellet is confined in an air chamber in said compliant material that is larger than the pellet whereby each pellet is free to move to a limited extent with respect to said compliant material whereby when mechanical vibration or mechanical wave energy is incident to said damper, said pellets are caused to move in random phase relationship feeding back energy out of phase with the incident energy.

14. A water-borne vehicle carrying apparatus capable of mechanical vibration in use and which will emit into the water a minimum of vibrations from such apparatus that can be detected from a distance and which will reflect a minimum of incident mechanical wave energy from an active search sonar equipment which comprises the hull of such vehicle, the exteriorly exposed surface of said hull carrying an attached layer of elastic deformable sheet material operable to absorb vibratory energy arriving at said layer from either direction thereby limiting passage of vibrations outwardly from said hull and absorbing incident vibratory energy from an external source to reduce the amount of energy from said external source that is reflected back toward said source.

15. A water-borne vehicle carrying apparatus capable of mechanical vibration in use and of reflecting mechanical vibrations that are incident thereon from an external sonar source, which comprises elastic, deformable material carried by said vehicle on exteriorly exposed areas thereof, and inertia masses supported by said material out of direct contact with said vehicle and free for limited movement independently of said vehicle to the extent permitted by the elasticity and deformability of said material, whereby the material and the inertia masses will absorb vibratory energy incident thereon from all directions and reduce transmission of vibratory energy outwardly from said vehicle and reduce reflection of vibratory sonar energy directed toward said vehicle from an external source.

16. The vehicle according to claim 15 wherein said inertia masses are a plurality of small bodies of relatively high densities supported entirely by said material.

17. The vehicle according to claim 15 wherein the said inertia masses are small rigid bodies of a material that is of much greater density than the elastic material and confined to said exposed area by said elastic material.

18. A water-borne vehicle containing mechanism that may undergo mechanical vibrations in use and having externally exposed surfaces through which energy of such vibrations may be imparted to the water in which the vehicle is borne, which comprises a layer of elastically flexible sheet material confined to each of such exposed surfaces through which one desires to stop transfer of vibrational energy to the water, and relatively dense, inertia means supported by each said layer out of direct contact with such exposed surface to which it is confined but free for limited vibration relatively to such exposed surface to which it is attached, whereby said material and inertia means will absorb the vibrational energy from said vehicle surface to which it is attached and convert some of the energy into heat which is dissipated in the vehicle and in the water in which the vehicle is borne, and feed back part of the energy in random phase relationship to attenuate the vibratory energy.

19. The vehicle according to claim 18 wherein said layer has the physical properties of flexible elastic rubber and rubber substitutes and the inertia masses are small dense bodies.

20. The vehicle according to claim 18 wherein said layer has the physical properties of flexible elastic rubber and rubber substitutes and has approximately closed cavities intermediate of its inner and outer faces, and said inertia masses are small solids loose in said cavities.

21. In a construction for controlling passage of sound vibrations through a wall, the combination with said wall of a sheet of a soft elastomer material disposed in close face to face relation to said wall, said sheet having inertia bodies distributed across and confined to it for limited movement relatively to said wall, whereby sound vibrations attempting to pass through said wall will impinge on said sheet and agitate said inertia bodies, by which agitation said bodies absorb the energy of said vibrations and convert it into heat which is dissipated in the sheet.

22. In a construction for controlling the transfer of vibrations through a wall, the combination with said wall of an elastic sheet disposed in close face to face relation to a face of said wall and carrying a plurality of relatively small, individual, inertia bodies, distributed across the sheet and confined thereon for limited local movement relatively to the wall, in the direction of impingement on the sheet of said vibrations, whereby said bodies will absorb energy from the impinging vibrations, and dissipate it.

23. In a construction for controlling the transfer of vibrations through a rigid member the combination with said member of an elastic sheet disposed in face to face relation to a face of said member, and inertia means carried by said sheet for limited local movement relatively to said sheet, whereby said inertia means will absorb and dissipate vibrational energy from said member.

References Cited in the file of this patent

"Sound Absorbent Coatings for Submarines," reported by P. Vigoureux to Combined Intelligence Objectives Sub-Committee, Item No. 1, File No. XXIV–8, April 23, 1945. Copy in Group 220, Class 340, Subclass 5D.